US009168679B2

(12) United States Patent
Odom et al.

(10) Patent No.: US 9,168,679 B2
(45) Date of Patent: Oct. 27, 2015

(54) PROGRAMMABLE SOFT LITHOGRAPHY: SOLVENT-ASSISTED NANOSCALE EMBOSSING

(75) Inventors: Teri W. Odom, Chicago, IL (US); Min Hyung Lee, Berkeley, CA (US); Mark D. Huntington, Evanston, IL (US); Wei Zhou, Evanston, IL (US)

(73) Assignee: Northwestern University, Evanston, IL (US)

( * ) Notice: Subject to any disclaimer, the term of this patent is extended or adjusted under 35 U.S.C. 154(b) by 544 days.

(21) Appl. No.: 13/135,910

(22) Filed: Jul. 18, 2011

(65) Prior Publication Data

US 2012/0013039 A1 Jan. 19, 2012

Related U.S. Application Data

(60) Provisional application No. 61/365,052, filed on Jul. 16, 2010.

(51) Int. Cl.
*B29C 33/38* (2006.01)
*B29C 61/02* (2006.01)
*B29C 33/40* (2006.01)
*B29C 55/00* (2006.01)
*B29C 33/42* (2006.01)

(52) U.S. Cl.
CPC ......... *B29C 33/3857* (2013.01); *B29C 33/3878* (2013.01); *B29C 33/40* (2013.01); *B29C 33/405* (2013.01); *B29C 33/424* (2013.01); *B29C 55/005* (2013.01); *B29C 61/02* (2013.01)

(58) Field of Classification Search
USPC ...... 264/226, 291, 319, 343, 225, 320, 342 R
See application file for complete search history.

(56) References Cited

U.S. PATENT DOCUMENTS

| | | | | |
|---|---|---|---|---|
| 6,663,820 B2 * | 12/2003 | Arias et al. | ...... | 264/496 |
| 7,442,316 B2 * | 10/2008 | Jeong et al. | ...... | 216/11 |
| 7,531,120 B2 * | 5/2009 | Van Rijn et al. | ...... | 264/299 |
| 7,704,425 B2 * | 4/2010 | Heidari et al. | ...... | 264/220 |
| 7,763,203 B2 * | 7/2010 | Arias et al. | ...... | 264/494 |
| 7,776,250 B2 * | 8/2010 | Low et al. | ...... | 264/496 |
| 7,887,722 B1 * | 2/2011 | Wu | ...... | 264/1.34 |
| 8,043,550 B2 * | 10/2011 | Chang et al. | ...... | 264/446 |
| 8,178,011 B2 * | 5/2012 | Kruglick | ...... | 264/2.5 |
| 2004/0188871 A1 * | 9/2004 | Shiao et al. | ...... | 264/1.31 |
| 2006/0121728 A1 * | 6/2006 | McMackin et al. | ...... | 438/637 |

(Continued)

FOREIGN PATENT DOCUMENTS

WO WO 2008134363 A1 * 11/2008

OTHER PUBLICATIONS

Lee MH, Huntinton MD, Zhou W, Yang JC, Odom TW. Programmable Soft Lithography: Solvent-Assisted Nanoscale Embossing. American Chemical Society, Nano Letters, 2011, 11, 311-315.
Grimes A, Breslauer DN, Long M, Pegan J, Lee LP, Khine M. Shrinky-Dink Microfluidics: Rapid Generation of Deep and Rounded Patterns. The Royal Society of Chemstry, Lap Chip, 2008, 8, 170-172.

(Continued)

*Primary Examiner* — Atul P. Khare
(74) *Attorney, Agent, or Firm* — Reinhart Boerner Van Deuren s.c.

(57) ABSTRACT

A method of forming a nanoscale pattern on a substrate is provided, wherein the method increases or decreases the spacing of patterns on the substrate relative to a master, while keeping the pattern feature size constant. The method can alternatively reduce the pattern feature size of the substrate relative to a master, while keeping the spacing patterns constant.

15 Claims, 7 Drawing Sheets

(56) References Cited

U.S. PATENT DOCUMENTS

| | | | |
|---|---|---|---|
| 2007/0077005 A1* | 4/2007 | Jeon et al. | 385/32 |
| 2007/0111366 A1 | 5/2007 | Odom et al. | |
| 2007/0153222 A1* | 7/2007 | Jo et al. | 349/187 |
| 2008/0138580 A1* | 6/2008 | Low et al. | 428/156 |
| 2009/0159200 A1* | 6/2009 | Rossi et al. | 156/292 |
| 2009/0281250 A1* | 11/2009 | DeSimone et al. | 525/418 |
| 2010/0159462 A1* | 6/2010 | Takayama et al. | 435/6 |

OTHER PUBLICATIONS

Using Shrinky Dinks for SANE Nanopatterning. http://www.frogheart.ca/?tag=solvent-assisted-nanoscale-embossing, Jul. 13, 2011.

* cited by examiner

PROGRAMMABLE SOFT LITHOGRAPHY: SOLVENT-ASSISTED NANOSCALE EMBOSSING

This application claims priority benefit from provisional application Ser. No. 61/365,052 filed on Jul. 16, 2010, the entirety of which is incorporated herein by reference.

This invention was made with government support under grant number CMMI-0826219 and grant number EEC-0647560 awarded by the National Science Foundation. The government has certain rights in the invention.

FIELD OF THE INVENTION

The present invention relates generally to an all-moldable nanofabrication method that can generate, from a single master, large-area nanoscale patterns with programmable densities, fill factors, and lattice symmetries.

BACKGROUND OF THE INVENTION

Molding as a means to replicate functional and artisanal masters can be traced from the manufacturing of Mesopotamian tools to the casting of Renaissance statues. Recently, molding at the nanoscale has driven the production of high-density optical and magnetic storage media (Kang, S. et al., *Opt. Eng.* 2000, 39, 689-694; Wu, W. et al., *Appl. Phys. A-Mater.* 2005, 80, 1173-1178), organic light-emitting diodes (Rogers, J. A. et al., *Appl.Phys. Lett.* 1998, 73, 294-296; Menard, E. et al., *Chem. Rev.* 2007, 107, 1117-1160), polymer photovoltaic cells (Kim, M. S. et al., *Appl. Phys. Lett.* 2007, 90, 123113-3; Ko, D. H. et al., *Nano Lett.* 2009, 9, 2742-2746), and field-effect transistors (Zhang, F. et al., *Nano Lett.* 2002, 2, 1373-1377; Hamedi, M. et al., *Nano Lett.* 2009, 9, 631-635; Ko, S. H. et al., *Nano Lett.* 2007, 7, 1869-1877). Although rigid molds can imprint soft and semi-hard materials, they are expensive to create and brittle at nanoscale dimensions (Chou, S. Y. et al., *Science* 1996, 272, 85-87; Chou, S. Y. et al., *Nature* 2002, 417, 835-837). Elastomeric molds have also been used to pattern soft materials, but their feature sizes are mostly limited to sub-micron dimensions (King, E. et al., *Adv. Mater.* 1997, 9, 651-654; Yang, P. et al., *Science* 2000, 287, 465-467; Zhao, X. M. et al., *Appl. Phys. Lett.* 1997, 71, 1017-1019; Kim, E. et al., *Nature* 1995, 376, 581-584; Rolland, J. P. et al., *J. Am. Chem. Soc.* 2005, 127, 10096-10100; Klajn, R. et al., *Science* 2007, 316, 261-264; Jeong, K. H. et al., *Science* 2006, 312, 557-561). However, what all current molding methods have in common is that their primary goal is to generate replicas of the master. Therefore, if different features are desired, new masters are necessary to create every new pattern.

SUMMARY OF THE INVENTION

In light of the foregoing, it is an object of the present invention to provide a solvent-assisted nanoscale embossing (SANE) method that can increase the spacing of patterns up to about 100% as well as decrease spacing patterns down to about 50% in a single step by stretching or heating a polymer substrate (inSANE). Also, SANE can reduce critical feature sizes as small as 45% compared to the master by controlled swelling of patterned (elastomeric SANE) molds with different solvents. Both the pattern densities and fill factors can be tuned continuously at will. These capabilities are applied to generate plasmonic nanoparticle arrays with continuously variable separations, and hence different optical properties, on the same substrate (see Henzie, J. et al., T. W. *Nat. Nanotechnol.* 2007, 2, 549-554, incorporated herein by reference; see also US 2007/0111366 and U.S. Ser. No. 11/493,254, non-published and allowed but not issued as of the filing of this application, also incorporated herein by reference). Properties for the plasmonic nanoparticle arrays depend critically on particle spacing.

SANE combines the strengths of serial fabrication techniques (prototyping patterns, high resolution) with those of parallel ones (high throughput, large patterned areas). Thus, SANE/inSANE enables unprecedented opportunities to manipulate electronic, photonic, and magnetic properties of nanomaterials by providing a low-cost, scalable route to large-area, nanoscale patterns.

Other objects, features, benefits and advantages of the present invention will be apparent from this summary and the following descriptions of certain embodiments, and will be readily apparent to those skilled in the art. Such objects, features, benefits and advantages will be apparent from the above as taken into conjunction with the accompanying examples, data, and all reasonable inferences to be drawn therefrom.

DETAILED DESCRIPTION OF THE INVENTION

Figure 1:
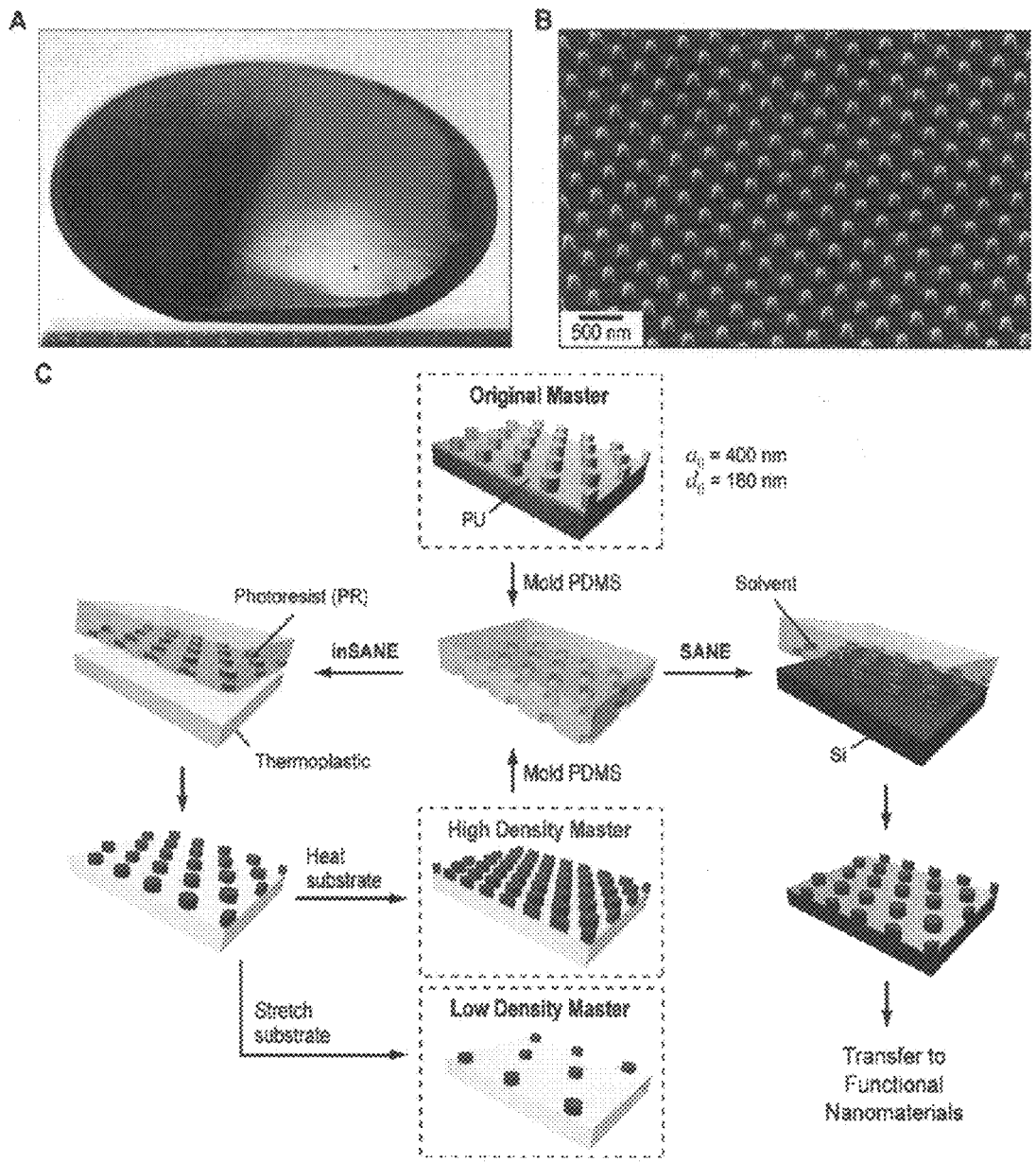
FIG. 1 Programmable soft lithography: Solvent-assisted nanoscale embossing (SANE); (A) Optical micrograph of a 6-in diameter PU master with pitch $a_0$=400 nm and feature size $d_0$=180 nm; (B) SEM image of a portion of the PU master in (A); (C) Scheme of the nanofabrication procedure to create high density and low density masters using inverse SANE (inSANE) and to produce patterns with features smaller than (but with the same pitch as) a master using SANE.

FIG. 1 illustrates certain non-limiting aspects and embodiments of the invention. Specifically, FIG. 1 summarizes how SANE is an all-polymer, parallel nanofabrication technique that can create arrays of many different patterns. Preferably, the SANE technique can generate at least four classes of different patterns from a single master: (i) arrays with higher densities; (ii) arrays with lower densities; (iii) arrays with the same densities but with smaller critical feature sizes; and (iv) arrays with different lattice symmetries. As referred to herein, "nanopattern" or "nanoscale pattern" refers to a nanometer scale structure wherein at least one lateral dimension is between the size of an individual atom and approximately 100 nm.

SANE can thus generate a wide-range of new masters and patterns that are easily transferred into functional materials and devices by conventional fabrication methods. To demonstrate these inclusive capabilities of SANE, a large-area (6-in diameter) polyurethane (PU) master molded with hexagonal arrays of posts (diameter $d_0$=180 nm, height h=330 nm, pitch $a_0$=400 nm) (FIGS. 1A-B) is selected (see Rolland, J. P. et al., *J. Am. Chem. Soc.* 2005, 127, 10096-10100, incorporated herein by reference). The elastomer poly(dimethylsiloxane) (PDMS) is then cast against the master to create PDMS molds either 1) for SANE, where the PDMS mold is first wet with solvent and then placed into contact with, for example, a photoresist-coated substrate, or 2) for inSANE, the inverse strategy, where a PDMS mold is wet with photoresist and then placed into contact with a substrate (FIG. 1C). Both SANE and inSANE can produce arrays of isolated photoresist nanopatterns. Those skilled in the art would appreciate that other similar elastomers can be used to cast against the master or substrate.

As such, one an embodiment of the invention is a a method of forming a nanoscale pattern on a substrate, the method comprising casting an elastomer against a surface of a nanoscale master template, the nanoscale master template comprising an array of patterns on the surface; removing the elastomer from the master template to produce an elastomer mold; wetting the elastomer mold with a suspended polymer; contacting the wet elastomer mold with a thermoplastic substrate; removing the thermoplastic substrate from the elastomer mold to produce a suspended polymer patterned substrate; and manipulating the suspended polymer patterned substrate such that separation between adjacent suspended polymer patterns is either increased or decreased to produce a lower-density nanoscale patterned substrate or a higher-density nanoscale patterned substrate, respectively, relative to the nanoscale master template.

Another embodiment of the invention is a method of forming a nanoscale pattern on a substrate, the method comprising casting an elastomer against a surface of a nanoscale master template, the nanoscale master template comprising an array of patterns on the surface; removing the elastomer from the master template to produce an elastomer mold; wetting the elastomer mold with an organic solvent to swell the elastomer mold; contacting the swollen elastomer mold to a suspended polymer layer on a substrate; removing the photoresist-layered substrate from the elastomer mold to produce a suspended polymer patterned substrate having pattern feature sizes smaller relative to the nanoscale master template.

As provided for herein, inSANE is an approach for designing new substrates with array densities different from that of an original master, while keeping the feature sizes constant. The critical step is that inSANE creates patterns on flexible substrates whose properties can be manipulated by external means. FIG. 1C depicts a scheme of inSANE on thermoplastic substrates (Shrink Film, pre-stressed polystyrene; Grimes, A. et al., *Lab Chip* 2008, 8, 170-172, incorporated herein by reference), where the separation between adjacent photoresist patterns is decreased if the thermoplastic film is uniformly heated, or increased if the thermoplastic is mechanically stretched. Depending on the array properties of interest, SANE molds can then be generated either from these new high- or low-density masters or from the original master. Typically, SANE is carried out on hard substrates such as silicon (Si) so that the photoresist nanopatterns can be transferred into functional materials for future applications.

As used herein, a thermoplastic substrate is a substrate which comprises one or more thermoplastic materials. Representative examples of thermoplastic materials are polystyrene, polypropylene, polyethylene, polyethylene terephtalate, polyester, polycarbonate, polyamide and the like.

The suspended polymer as used herein is preferably a photoresist. Regardless, such suspended polymers or polymer particles can comprise one or more polymers, such as, for example, polymers of (meth)acrylic acid, (meth)acrylamides, alkyl (meth)acrylates, alkenyl (meth)acrylates, aromatic (meth)acrylates, vinyl aromatic monomers, nitrogen-containing compounds and their thio-analogs, substituted ethylene monomers, cyclic olefins, substituted cyclic olefins, and the like.

A "pattern" as used herein, comprises one or more features, such as, for example, grooves, protrusions and/or other shapes formed in or on the surface of the template or substrate. An example of a pattern comprises, but is not limited to, a hexagonal array of posts.

Figure 2:
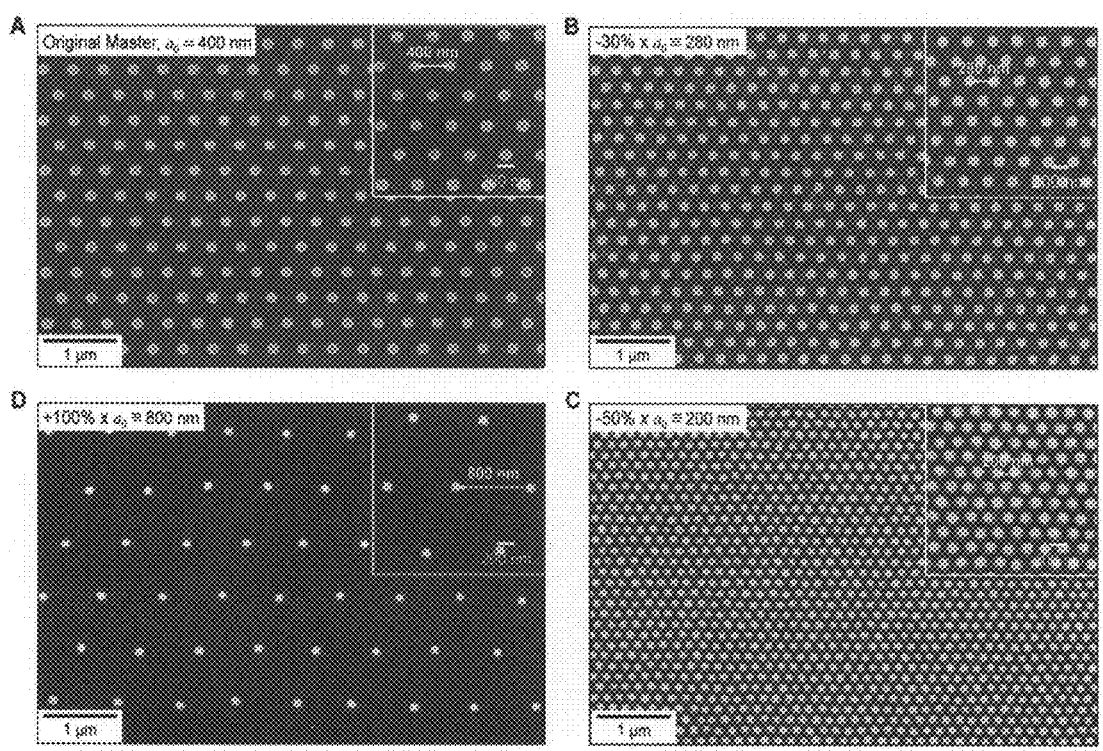
FIG. 2 New masters with different pattern densities from the same original master using inSANE and tunable substrates; SEM images of (A) original master and new masters with pitches that are (B) smaller (−30%), (C) smaller again (−50%), and (D) larger (+100%) than that of the original master ($a_0$=400 nm).

FIG. 2 highlights representative examples of how photoresist patterns (Shipley 1805) with lattice spacings different from the master ($a_0$=400 nm) can be created by inSANE. The feature sizes remain the same as those on the original master (FIG. 2A), but the total percentage change of separations possible is 400% (new spacings a=200-800 nm). To wet the inSANE mold with photoresist without affecting the sizes of the patterned features, the Shipley 1805 resist is reconstituted with ethanol. Otherwise, the organic solvent contained in the resist swells the PDMS mold as well as dissolve the thermoplastic substrate (Lee, J. N. et al., *Anal. Chem.* 2003, 75, 6544-6554, incorporated herein by reference). The inSANE mold is placed in contact with the substrate for 20 minutes at room temperature to solidify the photoresist patterns as the ethanol evaporates through the PDMS. Any residual photoresist film is removed with a short oxygen plasma (15 s).

Figure 5:
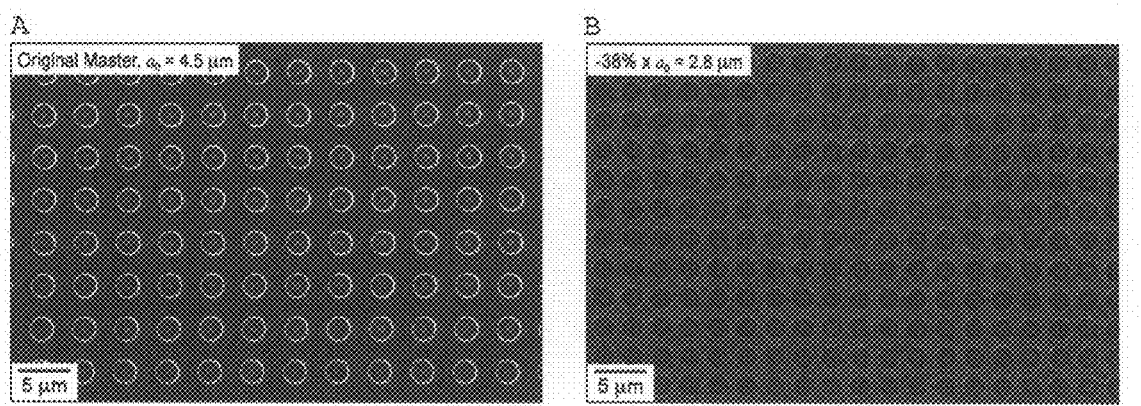
FIG. 5 shows microscale patterns with different pattern densities; (A) SEM images of the original pattern; (B) new pattern with a 38% smaller pitch (a0=4.5 μm).

To create patterns with higher array densities, the patterned resist is heated on Shrink Film in a convection oven at 115° C. After 20 minutes, the thermoplastic substrate shrinks by 30%, and the lattice spacing also decreases by 30% (FIG. 2B, a=0.70×$a_0$=280 nm). Hence, a new master (covering >10 cm$^2$) is readily achieved with a density 100% higher ($\rho$=1.5× 10$^9$ features/cm$^2$) than the original pattern ($\rho$=7.3×10$^8$ features/cm$^2$). After a longer heating time (40 minutes), the Shrink Film decreases in size by 50%, and the array spacing also decreases by 50% (FIG. 2C, a=0.50×$a_0$=200 nm). Thus, another master with a density 300% higher ($\rho$=2.9×10$^9$ features/cm$^2$) than the original can be formed. Significantly, the percentage decrease on the nanoscale is easily determined by measuring the macroscale change. The maximum shrinkage possible of the Shrink Film is around 60%. This unique approach to reduce the distances between isolated features is not limited to the nanoscale. Microscale patterns are also created and their pitch is reduced to result in higher density microarrays (FIG. 5). FIG. 5 depicts microscale patterns with different pattern densities with FIG. 5(A) being a SEM image of the original pattern and FIG. 5(B) being a SEM image of the new pattern with a pitch that was smaller (−38%) than that of the original master (a0=4.5 µm). This figure demonstrates how programmable soft lithography can be performed at all length scales.

Figure 6:
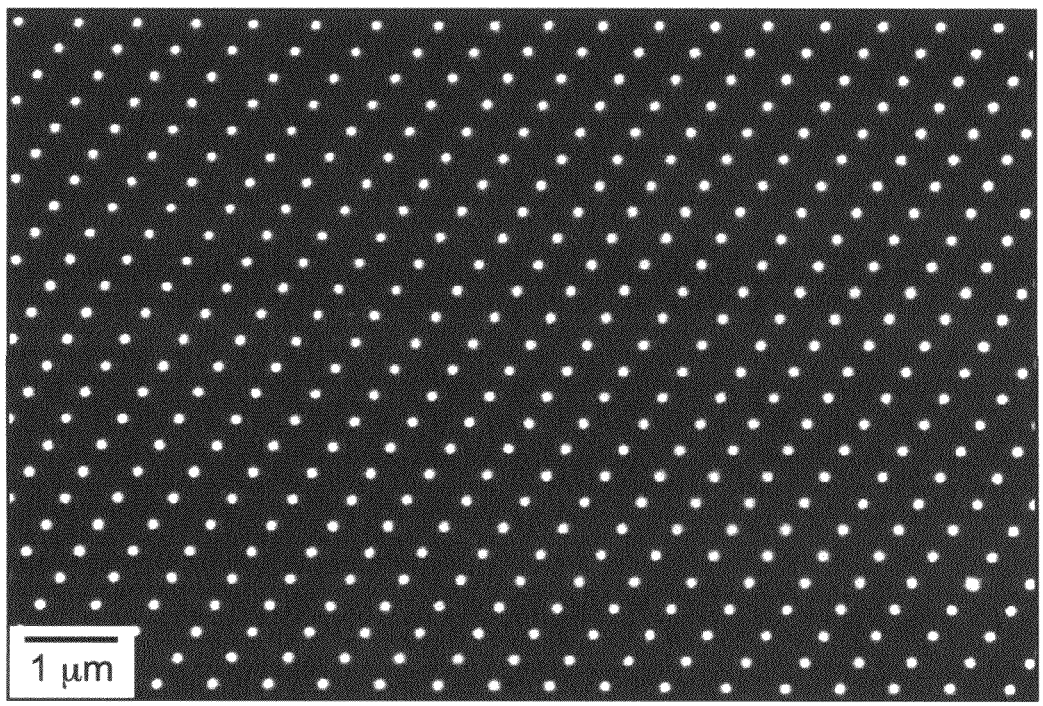
FIG. 6 is a new master with different lattice symmetries obtained by stretching in 1D.

To produce arrays with lower densities, the inSANE-patterned photoresist is heated on the Shrink Film at 115° C. and the substrate is mechanically stretched. Uniform stretching of the film in two perpendicular directions produces a low-density master with spacings up to 100% greater than the original pattern (a=2.0×$a_0$=800 nm) (FIG. 2D) and densities 75% lower (ρ=1.8×$10^8$ features/$cm^2$). The generation of low-density masters starting from a higher density pattern cannot readily be achieved by conventional soft lithography because (i) stretched PDMS molds will not only change the pitch but also the lateral and vertical sizes of the patterned features (Choi, H. K. et al., *Langmuir* 2009, 25, 12011-12014, incorporated herein by reference); and (ii) the decreased patterned heights prohibit further transfer to other materials. Low-density patterns with anisotropic lattice symmetries can also be fabricated by stretching in only one dimension (FIG. 6). Hexagonal arrays on Shrink Film are heated and then stretched in one direction to create a rectangular lattice (wherein the lattice of the master was a shape other than rectangular). Thus, the geometries of the patterned array, relative to the master, can also be changed by employing the techniques of inSANE.

Figure 3:
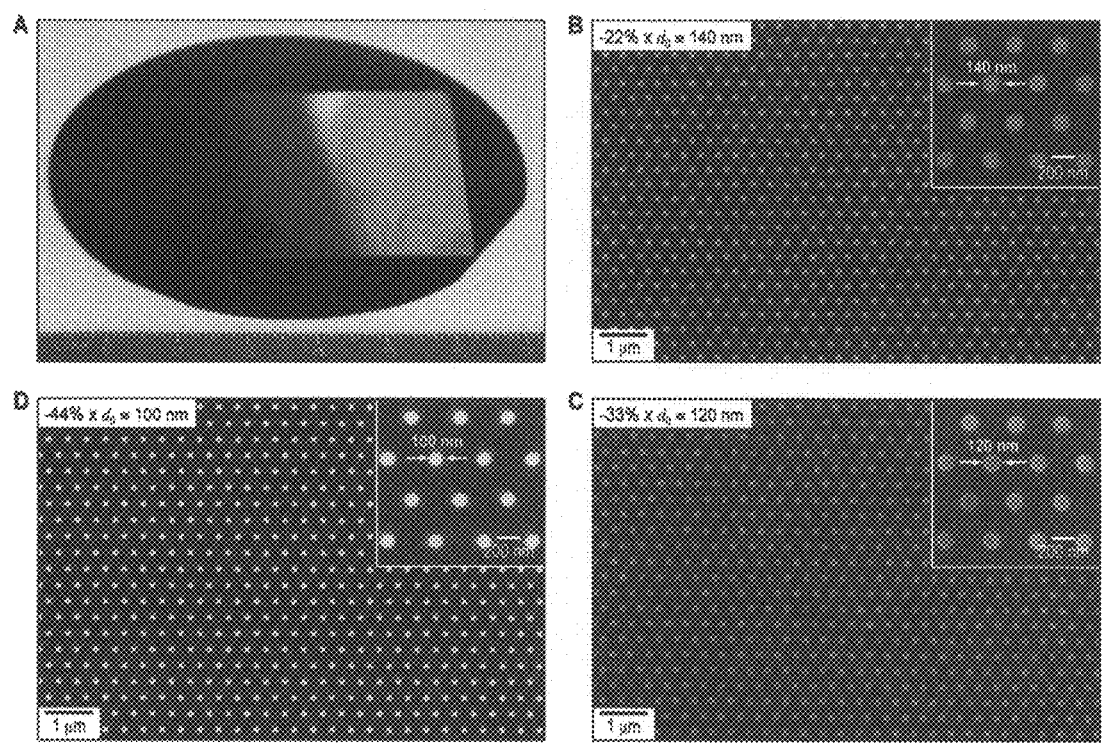
FIG. 3 Reduction of feature sizes using SANE with different solvents; (A) Optical micrograph of a 3-in Si wafer patterned with photoresist patterns by SANE. SEM images of patterns obtained after SANE using solvents with different swelling factors in PDMS (S): (B) dimethylformamide (S=1.02, d=140 nm); (C) isopropylalcohol (S=1.09, d=120 nm); (D) dichloromethane (S=1.22, d=100 nm); the array spacing $a_0$ is constant at 400 nm.

In addition to increasing and decreasing pattern density (while preserving feature size) using inSANE, SANE can create patterns with the same density but with smaller feature sizes. Thus, SANE generates arrays with different fill factors. SANE works by transforming a perceived disadvantage of PDMS, that the polymer swells in the presence of different solvents, into an advantage. In a nanopatterned PDMS mold, as the polymer regions increase in volume because of the solvent, the voids decrease. SANE molds are first wet with solvent, preferably an organic solvent, and then placed into conformal contact with a thin layer (t=200 nm) of photoresist (Shipley 1805) on a Si (100) wafer. The solvent trapped in the recessed wells of the PDMS mold causes both a reduction in size of the mold patterns (from PDMS swelling) and a dissolution of the photoresist film to fill the solvent wells (see Qin, D. et al., *Nat. Protoc.* 2010, 5, 491-502, incorporated herein by reference). After the solvent evaporates for 15 minutes, the mold is removed, and any residual resist between posts is removed by a 15-s oxygen plasma. Large-area SANE molds (>2 $in^2$) produce SANE patterns in photoresist that are extremely uniform (FIG. 3A).

Solvents with different swelling factors can be defined by the factor S, which is the ratio of the length D of PDMS in the solvent to the length $D_0$ of the PDMS in air (=D/$D_0$). Using the same SANE mold (from FIG. 2A; original master $d_0$=180 nm, $a_0$=400 nm) and different solvents, the sizes of the patterned photoresist on Si are controlled (FIGS. 3B-D). For example, SANE using dimethylformamide (S ~1.02) results in features that are reduced in size by 22% (d=0.78×$d_0$=140 nm) with a corresponding fill factor reduction of 40% (FIG. 3B). When a solvent with a higher S is used for SANE, such as isopropyl alcohol (S~1.09), the sizes of the photoresist posts decrease by 33% (d=0.67×$d_0$=120 nm), and the fill factor decreases by 55% (FIG. 3C). In yet another example, a large size reduction is achieved (while maintaining the integrity of the patterned mold and array) is 44% (d=0.56×$d_0$=100 nm) using dichloromethane (S~1.22), wherein the fill factor decreases by 70% (FIG. 3D). For all three solvents, the pitch remains nearly the same with only small changes in some areas (<3 nm) although there are substantial decreases in feature size. It is to be understood by one skilled in the art that one or more solvents can be employed to swell PDMS. Other solvents include, but are not limited to, pentane, hexanes, n-heptane, diisoproplyamine, triethylamine, ether, cyclohexane, trichloroethylene, xylenes, toluene, ethyl acetate, benzene, chloroform, 2-butanone, tetrahydrofuran, dimethylcarbonate, chlorobenzene, acetone, dioxane, pyridine, t-butyl alcohol, acetonitrile, 1-propanol, ethanol, methanol and the like (see Lee et al., *Anal. Chem.* 2003, 75, 6544-6554, incorporated herein by reference).

Figure 4:
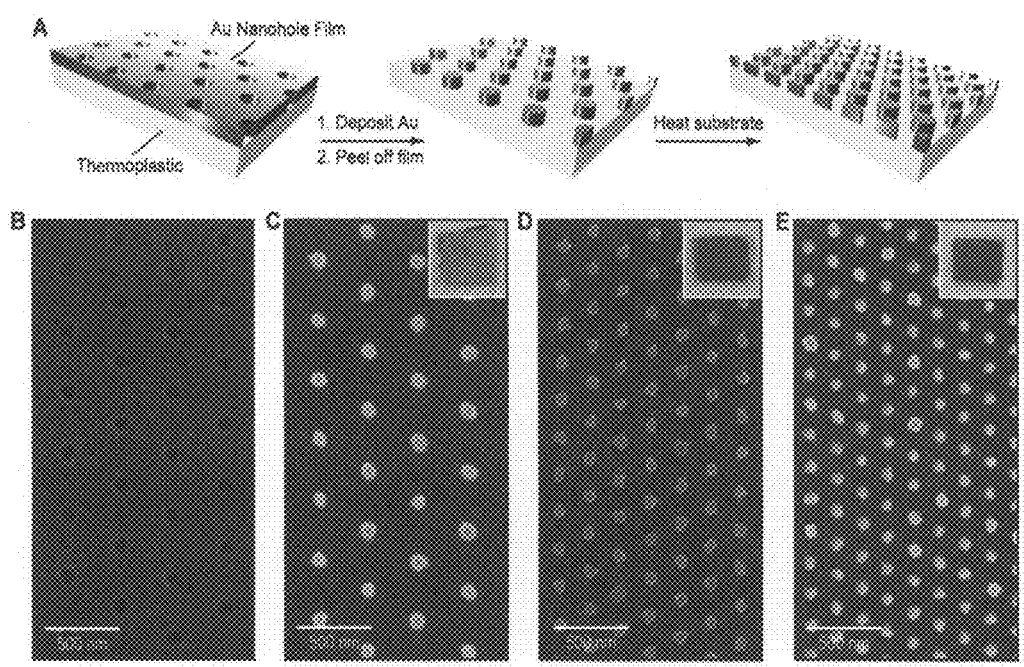
FIG. 4 Nanoparticle arrays with different spacings on the same substrate; (A) Scheme to create high density nanoparticle arrays starting from a gold nanohole array as a deposition mask followed by heating of the Shrink Film substrate; (B) SEM images of gold nanohole array mask (thickness=100 nm) with 400-nm spacing; (C-E) SEM images of gold nanoparticle arrays with different pitches on the same Shrink Film substrate: (C) 400 nm (no heating), (D) 250 nm (film in (C) heated at 115° C. for 20 min), and (E) 200 nm (film in (D) heated for 20 min more); insets show optical images of color change as the pitch between nanoparticles in the arrays is reduced.

SANE and inSANE, therefore, offer a programmable strategy to access nanostructured surfaces with nearly any type of pattern size, density, or lattice symmetry so that the prototyping of nanopatterns no longer needs to be separated from the scaling of them. However, the value of any nanofabrication technique is in its ability to transfer the patterns into functional materials. SANE can create photoresist patterns that can then be converted into large-area arrays of metal nanostructures using PEEL. FIG. 4 illustrates how nanoparticle arrays with different lattice spacings on the same substrate can be achieved. First, nanoparticle arrays are fabricated by deposition of 50-nm of gold through a nanohole array film on a Shrink Film (FIG. 4B) followed by removal of the hole array. The hole array is produced starting from SANE molds from the first master ($a_0$=400 nm, FIG. 2A). FIG. 4C indicates that the gold nanoparticles have diameters similar to those of the nanoholes (FIG. 4B). Next, the Shrink Film substrate patterned with gold nanoparticles is heated to 115° C. for 25 minutes to reduce the separation between particles to a=250 nm (FIG. 4D). After a longer heating time (40 minutes), the Shrink Film further decreases the nanoparticle spacing to a=200 nm (FIG. 4E).

Figure 7:
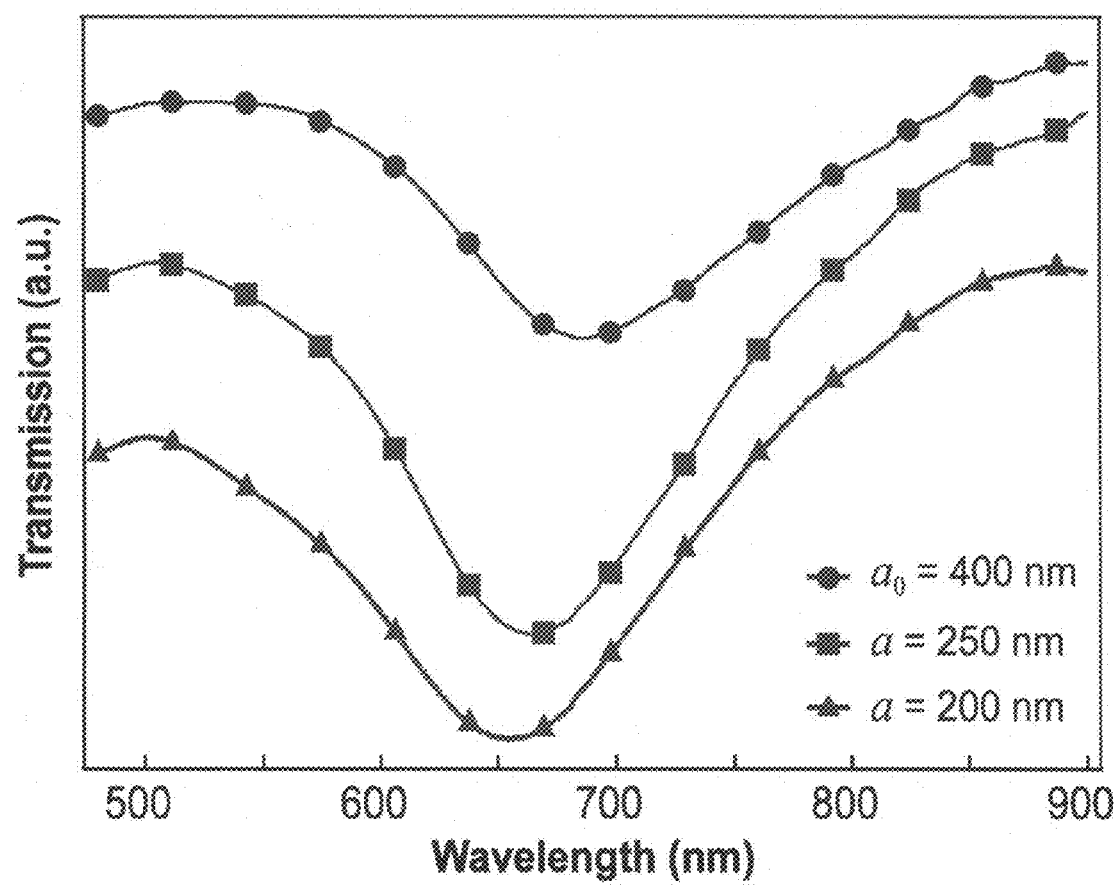
FIG. 7 is a transmission spectra of gold nanoparticle arrays with different pitch from FIGS. 4(C-E).

This reduction in array pitch of up to about 50% produces a large macroscopic difference in color (FIGS. 4C-E, insets). Optical transmission spectra of the nanoparticle arrays (superstrate water, n=1.33) shows that the collective plasmon resonance blue-shifted (FIG. 7) because of dipolar coupling between particles in the array (Lamprecht, B. et al., *Phys. Rev. Lett.* 2000, 84, 4721, incorporated herein by reference). The substrate is Shrink Film thermoplastic (n~1.5) and the superstrate is water (n=1.33). This nanoparticle array fabrication method opens a way to solve a challenge in plasmonics: to control the spacing between nanoparticles continuously on the same substrate. Typically, if different separations are desired, new samples must be prepared for each new separation; however, by patterning nanoparticles directly on the thermoplastic films, this problem has been overcome.

In summary, a simple yet potentially transformative method has been developed to create new nanoscale masters with variable spacings and feature sizes starting from a single master pattern. This programmability offers significant advantages over nanoimprint lithography and other molding methods in terms of cost and over direct-write nanolithography methods in terms of scalability. The ability to control nanostructure array densities and fill factors allows for the rapid prototyping and testing of plasmonic structures with tunable resonances, photovoltaic cells with enhanced absorption, and storage media with high capacities. Moreover, SANE represents a new paradigm to introduce nanofabrication capabilities into any lab because all the materials used are inexpensive, and the procedures can be carried out on the benchtop.

The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. A method of forming a master mold, the method comprising:
   casting an elastomer against a nanoscale master template surface having a template surface pattern array;
   removing the cast elastomer from the template surface as an elastomer mold;
   wetting the elastomer mold with a suspended polymer;
   contacting the wet elastomer mold with a thermoplastic master mold substrate;
   removing the contacted substrate from the elastomer mold as a suspended polymer patterned master mold having an initially constant pattern feature size and spacing with respect to pattern features of the template surface pattern array and having a tunable pattern density across a range from 50% less than to 100% greater than the initial pattern density; and
   manipulating the master mold so as to either increase or decrease the initial pattern density.

2. The method according to claim 1, wherein the master template comprises a polymer.

3. The method according to claim 2, wherein the master template polymer is polyurethane.

4. The method according to claim 1, wherein the elastomer is poly(dimethylsiloxane).

5. The method according to claim 1, wherein said manipulating comprises heating the master mold so as to increase pattern feature density by decreasing separation between pattern features thereof.

6. The method according to claim 5, wherein said heating is uniformly applied at 115° C. for 20-40 minutes.

7. The method according to claim 5, wherein pattern feature sizes of the master mold remain constant with respect to pattern features of the template array after said manipulating.

8. The method according to claim 1, wherein said manipulating comprises mechanically stretching the master mold so as to decrease pattern density by increasing separation between pattern features thereof.

9. The method according to claim 8, further comprising heating the master mold prior to said mechanical stretching.

10. The method according to claim 8, wherein said stretching is in only one direction of the master mold.

11. The method according to claim 8, wherein pattern feature sizes of the master mold remain constant with respect to pattern features of the template array after said manipulating.

12. The method according to claim 1, wherein the master mold substrate comprises one or more of a polymer selected from the group consisting of polystyrene, polypropylene, polyethylene, polyethylene terephthalate, polyester, polycarbonate and polyamide.

13. The method according to claim 1, wherein the template array comprises a hexagonal array of posts.

14. The method according to claim 1, wherein the suspended polymer is a photoresist.

15. The method according to claim 1, wherein the suspended polymer comprises one or more polymers selected from the group consisting of polymers of (meth)acrylic acid, (meth)acrylamides, alkyl (meth)acrylates, alkenyl (meth)acrylates, aromatic (meth)acrylates, vinyl aromatic monomers, nitrogen-containing compounds and their thio-analogs, substituted ethylene monomers, cyclic olefins, and substituted cyclic olefins.

* * * * *